United States Patent [19]

Newell, III

[11] Patent Number: 4,659,009

[45] Date of Patent: Apr. 21, 1987

[54] ENVIRONMENTAL CONTROL SYSTEM WITH HUMIDITY CONTROL AND METHOD

[75] Inventor: Alfred T. Newell, III, Birmingham, Ala.

[73] Assignee: A. T. Newell Co. Inc., Birmingham, Ala.

[21] Appl. No.: 719,743

[22] Filed: Apr. 4, 1985

[51] Int. Cl.⁴ .............................................. B01F 3/02
[52] U.S. Cl. ................................... 236/44 C; 236/49; 165/21
[58] Field of Search ................. 236/44 C, 49; 165/16, 165/21

[56] References Cited

U.S. PATENT DOCUMENTS

| | | | |
|---|---|---|---|
| 3,446,272 | 5/1969 | Gaines, Jr. | 165/21 |
| 4,044,823 | 8/1977 | Biesecker | 236/44 C |
| 4,430,828 | 2/1984 | Oglevee et al. | 236/44 C |

Primary Examiner—William E. Wayner
Attorney, Agent, or Firm—James W. Potthast

[57] ABSTRACT

An environmental control system has a controller (10) which causes heating apparatus (12A) or ventilation apparatus (12B) to operate through thermostatic dead zone temperature ranges, in response to excessive relative humidity. In the event the heating apparatus (12A) is actuated in response to falling temperatures, ventilation, previously called for by excess humidity, is terminated to prevent inefficiency due to concurrent heating and ventilating. After fresh air of relative lower humidity is introduced by ventilation, the fresh air is heated to further reduce the relative humidity.

8 Claims, 3 Drawing Figures

ENVIRONMENTAL CONTROL SYSTEM WITH HUMIDITY CONTROL AND METHOD

BACKGROUND OF THE INVENTION

This invention relates to an environmental control system and a method of employing same to control both the temperature and humidity of a controlled space, such as a poultry house.

It is well known that to optimize the health, growth rate and production of farm animals, such as chickens, contained in agricultural enclosures, such as poultry houses, it is necessary to control both the temperature and the relative humidity. Accordingly, as shown in U.S. Pat. No. 3,511,299, entitled "Condition Responsive Closure Operating Device", and assigned to the asignee of this invention, it is known to provide automatic ventilation systems which are controlled to provide increased ventilation/cooling on an override basis in response to excess humidity. Ventilation/cooling is operated until either a desired relative humidity level is attained or a minimum selected temperature is reached.

Similarly, it is known to over-cool air with an air conditioning unit to reduce humidity by removing moisture from the air through condensation. For instance, in U.S. Pat. No. 4,290,480 of Sukowski and entitled "Environmental Control System", an air conditioning unit is actuated to reduce relative humidity. If this also reduces the temperature below a preselected limit, then heaters controlled by a thermostat are operated concurrently with the cooling air conditioning.

Multiple stage controllers are also known such as shown in U.S. Pat. No. 3,714,980 of Lancia et al. in which multiple humidifiers and dehumidifiers are caused to operate at different humidity levels while independent controllers responsive to temperature only cause heaters/coolers to operate.

Environmental thermostatic control systems are also known in which both heaters and coolers are controlled in accordance with temperature alone. Such a system may have established "dead zones" of temperature during which neither heaters nor coolers are actuated as in the system shown in U.S. patent application Ser. No. 06/584,398 of Alfred T. Newell III et al., filed Feb. 28, 1984, and entitled "Electronic Thermostat" and assigned to the assignee of this invention.

A problem with the systems which operate ventilation/cooling apparatus concurrently with heaters, is that they are wasteful of energy. In a poultry house in which excessive relative humidity is caused by to moisture from the birds, ventilation alone will reduce relative humidity if the relative humidity of the fresh air is lower than that of the humid air within the enclosure at the outside ambient temperature. However, relative humidity can also be lowered simply by raising the temperature, but this natural beneficial effect is reduced by continuing ventilation after heaters have begun to operate.

SUMMARY OF THE INVENTION

Accordingly, the principal object of the present invention is to provide an environmental control system for controlling the temperature and humidity of an enclosed space, such as a poultry house, which will operate at an increased efficiency by overcoming some of the problems of the foregoing systems.

This objective is achieved by the present invention in two different ways. First, even if no ventilation is provided, heaters which are normally not operated when the temperature is in so-called dead zones, are caused to operate through the dead zone temperature ranges to increase temperature and thereby reduce relative humidity. Secondly, if a ventilation system is available, then the ventilation system will be actuated in response to excessive humidity to initially reduce relative humidity through the introduction of fresh air. However, if this causes the temperature to be reduced, so that the heaters are caused to turn on, then the ventilation system is deactuated and the heaters are operated to reduce relative humidity further.

In keeping with this first aspect of the invention, an environmental control system having temperature controlled air conditioning apparatus with means for establishing dead zones is provided with a humidity controller. The humidity controller comprises means for sensing relative humidity within a controlled space and means responsive to the humidity sensor for causing said air conditioning apparatus to be actuated during the dead zone until the sensed humidity is reduced to a preselected level. Preferably, the air conditioning apparatus is a heater for reducing the relative humidity by raising the temperature.

In keeping with the other aspect of the invention, an environmental control system having a heating apparatus is provided with a humidity controlled sub-system. The sub-system comprises means for sensing the relative humidity, a ventilation system, and means for actuating the ventilation system in response to the relative humidity exceeding a preselected value until the heating apparatus is actuated by said temperature responsive means to increase the temperature and thereby reduce the relative humidity. Preferably, the ventilation actuating means includes a logic control circuit connected with and responsive to both a humidity sensor circuit and an electronic thermostatic circuit.

Thus, a method of controlling the relative humidity within a controlled space, comprising the steps of: (1) sensing the temperature within the controlled space, (2) controlling a heating apparatus in accordance with sensed temperature to maintain a preselected temperature range within the controlled space, (3) actuating a ventilation system to introduce fresh air into the controlled space, and (4) deactuating the ventilation system in response to actuation of the heating apparatus in accordance with sensed temperature.

Preferably, the relative humidity is further controlled by causing heating apparatus to heat through dead zone temperature ranges in response to sensed relative humidity. Also, preferably the fresh air is of lower relative humidity than the stale air so that ventilation initially reduces the relative humidity before it is reduced further by means of heating.

BRIEF DESCRIPTION OF THE DRAWINGS

The foregoing objects, features and advantages will be described in greater detail and others will be made apparent from a reading of the following detailed description of the preferred embodiment, which is given with reference to the figures of the drawings, in which.

DETAILED DESCRIPTION

Figure 1:
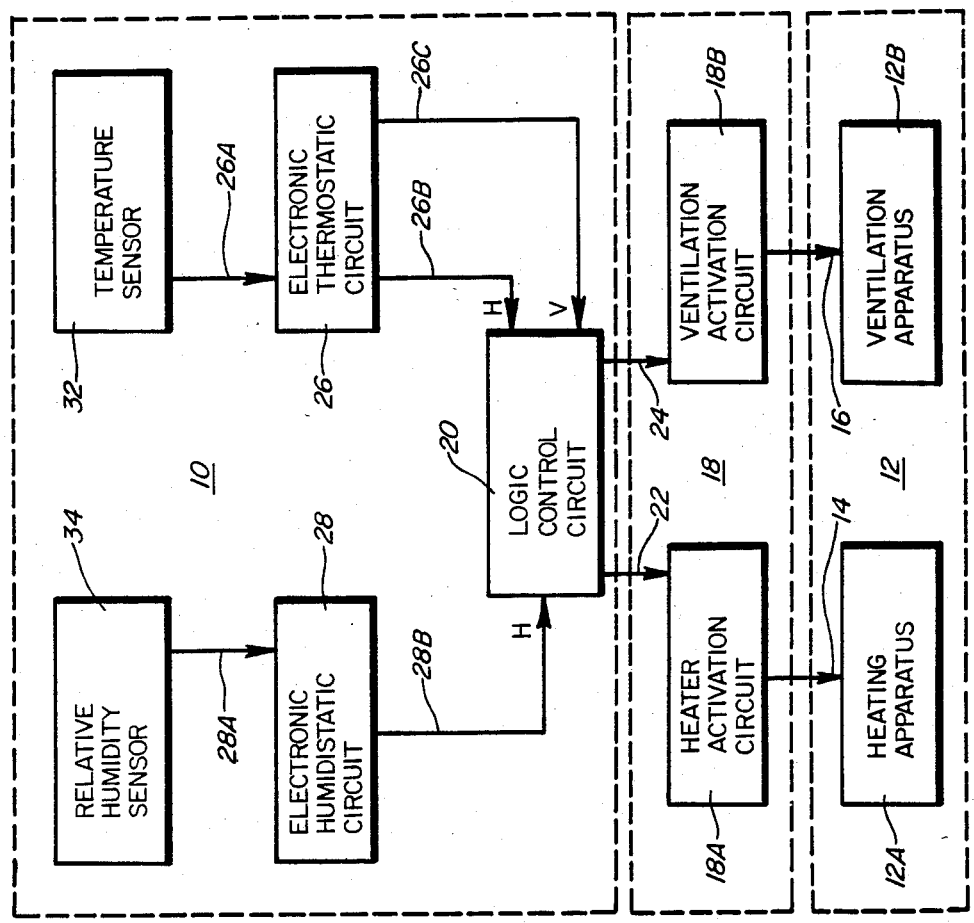
FIG. 1 is a functional block diagram of a preferred embodiment of the environmental control system of the present invention.

Turning to FIG. 1, a preferred embodiment of the environmental control system is seen to comprise a controller 10 and an air conditioning apparatus 12. The air conditioning apparatus 12 is controlled in response to both the temperature and the relative humidity within preselected acceptable ranges for the health and welfare of the chickens or other animals within an enclosure associated with the air conditioning apparatus 12. This enclosure, such as a poultry house, generally defines the controlled space, although it may be defined by only a section of an entire building.

The air conditioning apparatus 12 includes heating apparatus 12A, such as an electrical heater or an electrically controlled gas or oil heater. Upon receipt of a heater actuation signal at its input 14, the heating apparatus 12A operates to increase the temperature of the controlled space until the actuation signal is terminated. Warm air is more capable of maintaining moisture and, thus, an increase in temperature causes a reduction in relative humidity if total moisture content remains the same. This fact is used to advantage in this invention to reduce relative humidity.

Preferably, and with respect to another important aspect of this invention, the air conditioning apparatus also includes a ventilation apparatus 12B such as automatically moveable curtains or movable ventilation baffles or louvers for increasing or decreasing the effective size of ventilation openings. Examples of such ventilation system can be seen in U.S. patents, such as aforementioned U.S. Pat. No. 3,511,299 of Newell III et al., entitled "Condition Responsive Closure Operating Device; U.S. Pat. No. 3,802,479 of Newell III et al., entitled "Condition Responsive Closure Device"; and U.S. Pat. No. 4,241,871 of Newell III et al., entitled "Apparatus and Method For Ventilation of Animal Enclosures". Reference should be made to these patents for details of operation. However, for purposes of this invention, the ventilation apparatus can operate on a simple on/off basis. When an actuation signal is applied to the input 16, it assumes a maximum ventilation condition. When the actuation signal is removed, then it assumes a minimum ventilation condition.

The ventilation apparatus is used to reduce relative humidity by substituting, through means of ventilation outside air for inside air of less relative humidity, at least, of less absolute humidity. If the new fresh air is cooler, then the reduction in relative humidity is obtained at the expense of lowering the temperature within the controlled space. As will be apparent, if the temperature drops sufficiently to cause actuation of the heating apparatus 12A, then it is also probable that ventilation is no longer required. In such case, the ventilation apparatus would be deactuated, so that the system does not attempt to both heat and cool the air within the controlled space concurrently.

The air conditioning apparatus receives the actuation signals at inputs 14 and 16 from an actuation circuit 18 which in turn, responds to logic actuation, or contorl, signals from a logic control circuit 20. The actuation circuit 18 has two inputs 22 and 24 from the logic circuit 20 which are respectively connected to a heater actuation circuit 18A and a ventilation actuation circuit 18B. Both circuits 18A and 18B may be identical and includes a relay switch that is controlled to close and apply power to the apparatus 12A or 12B connected therewith at a sufficient level for actuation. Reference to U.S. patent application Ser. No. 06/584,398 of Alfred T. Newell III et al., filed Feb. 28, 1984, and entitled "Electronic Thermostat" should be made for details of a suitable circuitry for the actuation circuit.

Control of the actuation circuits 18A and 18B is achieved through the selective application of the control signals. For instance, when a logic 1-state actuation signal is applied to either of inputs 22 or 24, power actuation at associated apparatus inputs 14 and 15 is achieved. As will be explained with reference to FIG. 2, the logic circuit 20 produces the logic actuation signals on its outputs 22 and 24 in response to signals from an electronic thermostatic circuit 26 and an electronic humidistatic circuit 28. The electronic thermostatic circuit 26 responds to sensor signals provided at its input 26A by a temperature sensor 32. The humidistatic circuit 28 responds to sensor signals at its input 28A obtained from a relative humidity sensor 34. Reference should be made to the aforementioned U.S. patent application Ser. No. 06/584,398 of Newell III et al. for details of suitable circuitry for performing the functions of the temperature sensor 32 and the electronic thermostatic circuit 26 or the electronic humidistatic circuit 28. Likewise, reference can be made to aforementioned U.S. Pat. Nos. 3,714,980 of Lancia et al. and 4,290,480 of Sulkowski for suitable circuitry for the humidity sensor 36 and humidistatic electronic circuit 28.

Briefly, however, both circuits 26 and 28 function to produce their sensor actuation signals, such as logic 1-state signals, on their outputs 26B, 26C and 28B whenever the sensor signals applied to their respective inputs 26A and 28A are within a preselected range of values corresponding to a preselected range of temperature or relative humidity. For instance, when sensed temperature decreases to a preselected heat actuation temperature, a 1-state signal is generated on output 26B. A hysteresis characteristic is provided, so that when the temperature increases to a second preselected heat deactuation level, greater than the heat actuation temperature level, the 1-state signal is terminated. Likewise, if the temperature rises above a preselected ventilation actuation temperature, then a 1-state ventilation actuation 1-state signal is generated on output 26C. When the temperature decreases to a preselected ventilation deactuation temperature, then a 0-state signal is generated on output 26C to cause deactuation of the ventilation apparatus 12B.

Preferably, the preselected ventilation deactuation temperature is greater than the heater deactuation temperature. Accordingly, a "dead zone" temperature range exists during which neither the ventilation actuation signal nor the heater actuation 1-state signals are being generated.

In keeping with an important aspect of the present invention, in the event the humidity exceeds a preselected actuation level, such as 45% R.H., the logic control circuit 20 will cause the heating apparatus 12A to be actuated and to operate through a thermostatic dead zone in which the heater would not otherwise be actuated in response to temperature.

In keeping with another aspect of the invention, when ventilation apparatus 12B is provided, as shown, if the relative humidity exceeds a preselected level, the ventilation apparatus is actuated until, or unless, the heating apparatus is actuated in response to the temperature being below the preselected heater actuation temperature. When the heating apparatus is actuated, then the ventilation apparatus, previously actuated in response to excessive humidity, is deactuated. The resultant increase of temperature from the actuated heating apparatus 12A is relied upon to decrease relative humidity. Once the desired relative humidity is reached, by continuing actuation of the heating apparatus beyond the thermostatic deactuation temperature, if necessary, the humidity sensor signal is terminated.

When this happens, the heating apparatus is deactuated, if the temperature actuation signal has been terminated. If not, deactuation occurs later, after the temperature rises to the heater deactuation temperature. If the temperature decreases below the heater deactuation temperature, and the humidistatic circuit 28 again generates an actuation signal, the ventilation apparatus 12B will again be actuated, and the cycle is repeated.

Figures 2A, 2B:
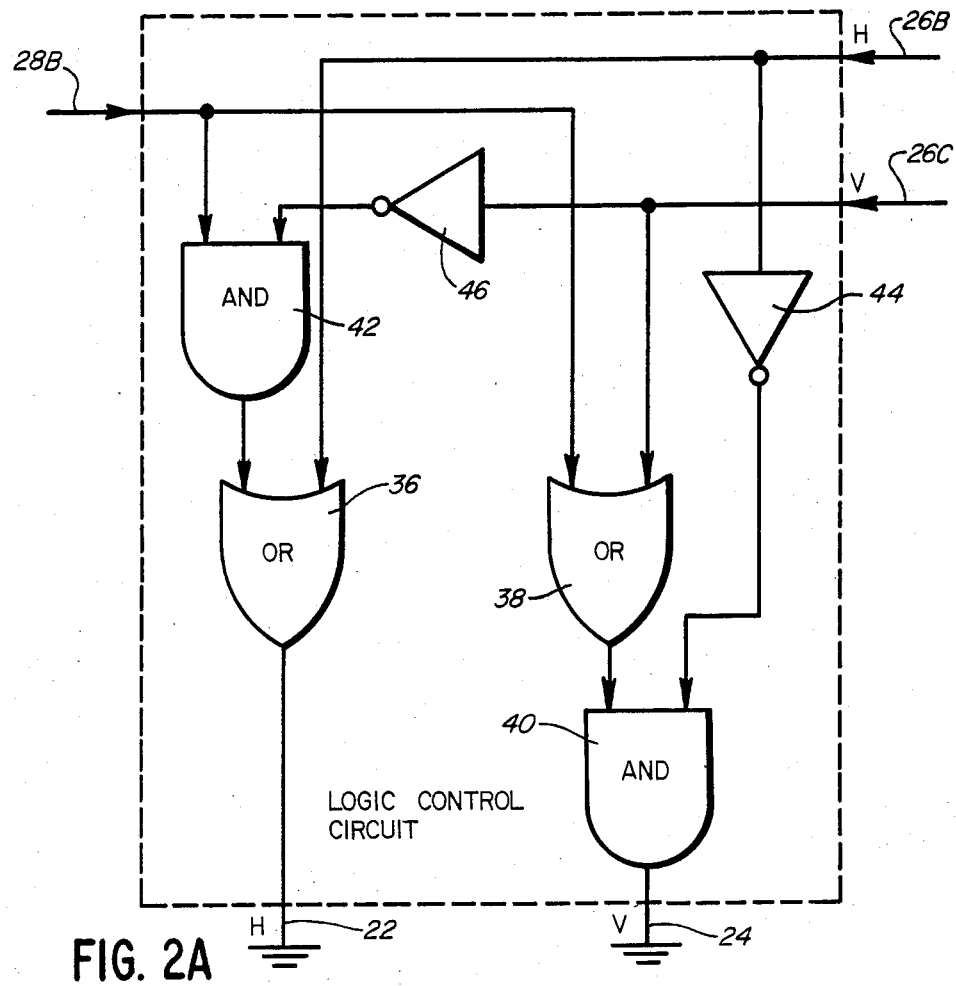
FIG. 2A is a circuit logic diagram for the logic control circuit functional block of FIG. 1.
FIG. 2B is a truth table for the logic control circuit.

Referring now to FIG. 2A, the logic circuit is seen to include a heater actuation OR-gate 36, a ventilation actuation OR-gate 38, a ventilation actuation AND-gate 40, a disable AND-gate 42, an inverter 44 and an inverter 46. The operation of the logic circuit is illustrated by the truth table of FIG. 2A, in which a 1-state signal indicates a call for actuation.

As seen from the truth table, there is a call for ventilation when either a 1-state ventilation actuation signal is applied to OR-gate 38 from either the electronic thermostat circuit 26 at its output 26C or when the electronic humidistatic circuit 28 generates an excess humidity 1-state signal at its output 28B and the electronic thermostat is not calling for heater actuation at its output 26A. If it is, then this 1-state signal on output 26B is inverted by inverter 44 to a 0-state signal which disables AND-gate 40 from generating a 1-state ventilation actuation signal.

If ventilation actuation is not being called for by a 1-state signal on output 26C, then a 1-state enable signal is generated on the output of inverter 46 which is applied to enable AND-gate 42 to respond to a 1-state excess humidity signal on control circuit output 28B. Response is by production of a 1-state signal on its output which is applied to an input of OR-gate 36. If a 1-state signal is applied to either of the two inputs of OR-gate 36, then a 1-state heater actuation control signal will be generated on its output and applied to input 22 of heater actuation circuit 18A. Thus, if the call for heater actuation from the electronic thermostatic circuit 26A is absent, but humidity is excessive, the heater will continue to be actuated until the humidity is brought under control. However, if ventilation is being called for because of excessive temperature, the heater will not be actuated by a 1-state signal from output 28B of the humidistatic circuit 28.

Instead, a 1-state ventilation actuation signal on output 26C will cause actuation. If the temperature drops beneath the ventilation deactuation temperature, but a 1-state signal on output 28B continues to indicate excessive humidity, the 1-state ventilation actuation signal will continue until either the humidity is reduced to a preselected level, or the temperature drops sufficiently for a 1-state actuation signal to be again generated on the output 26B.

Thus, a method is provided for controlling the relative humidity within a controlled space, comprising the steps of sensing the temperature within the controlled space, controlling a heating apparatus in accordance with sensed temperature to maintain a preselected temperature range within the controlled space, actuating a ventilation system to introduce fresh air into the controlled space and deactuating the ventilation system in response to actuation of the heating apparatus in accordance with sensed temperature. Preferably, the heating apparatus is caused to continue heating through any dead zones established by the thermostatic circuit. If the fresh air introduced by ventilation is of lower relative or absolute humidity than the stale air, then it is seen that a method of reducing relative himidity by first introducing fresh air of lesser relative or absolute humidity and then, if this does not reduce relative himidity within the controlled space, to terminate ventilation and then heat the fresh air to further reduce relative himidity.

While a particular embodiment has been disclosed for illustrative purposes, it should be appreciated that the inventive concept is not so limited but rather is defined by the following claims.

What is claimed is:

1. In an environmental control system having heating apparatus and temperature responsive means for controlling the heating apparatus, a humidity controlled sub-system, comprising:
   means for sensing the relative humidity;
   a ventilation system; and
   means for actuating the ventilation system in response to the relative humidity exceeding a preselected value until the heating apparatus is actuated by said temperature responsive means to increase the temperature and thereby reduce the relative humidity; and in which
   said heating apparatus controlling means includes a humidity sensor and a humidistatic circuit responsive to the humidity sensor for producing a binary actuation signal in response to sensed humidity.

2. The environmental control system of claim 1 in which said ventilation system comprises moveable ventilation louvers and means for causing said louvers to open and close when actuated and deactuated, respectively.

3. The environmental control system of claim 1 in which said ventilation actuating means includes a logic circuit connected with and responsive to both a humidity sensor circuit and an electronic thermostatic circuit.

4. The environmental control system of claim 3 in which said ventilation actuation circuit includes means responsive to an output signal from said logic circuit to actuate said ventilating apparatus until said heating apparatus is actuated.

5. The environmental control system of claim 1 in which said heating apparatus controlling means includes a heater actuation circuit responsive to said binary actuation signal to actuate the heating apparatus.

6. The environmental control system of claim 1 in which said heater controlling means includes a heater actuation circuit responsive to signals from either a humidity sensor circuit or an electronic thermostatic circuit to actuate the heating apparatus.

7. A method of controlling the relative humidity within a controlled space, comprising the steps of:
   sensing the temperature within the controlled space;
   controlling a heating apparatus in accordance with sensed temperature to maintain a preselected temperature range within the controlled space;
   actuating a ventilation system to introduce fresh air into the controlled space;
   deactuating said ventillation system in response to actuation of the heating apparatus in accordance with sensed temperature;

establishing a dead zone temperature range over which said heating controlling means does not call for actuation of the heating apparatus; and causing said heating apparatus to continue heating through said dead zone in response to the sensed relative humidity.

8. The method of claim 7 in which said fresh air is of lesser absolute humidity than the air it replaces within the controlled space and including the step of heating the fresh air to further reduce the relative humidity within the controlled space.

* * * * *

UNITED STATES PATENT AND TRADEMARK OFFICE
CERTIFICATE OF CORRECTION

PATENT NO. : 4,659,009
DATED : April 21, 1987
INVENTOR(S) : Alfred T. Newell III It is certified that error appears in the above-identified patent and that said Letters Patent is hereby corrected as shown below:

Col. 1, line 16, change "asignee" to - assignee -;
Col. 1, line 50, delete "to" and insert - too much -;
Col. 3, line 60, change "contorl" to - control -;
Col. 4, line 34, after "when" insert - the -;
Col. 5, line 21, change "2A" to - 2B -;
Col. 6, line 7, change "himidity" to - humidity -;
Col. 6, line 9, change "himidity" to - humidity -;
Col. 6, line 11, change "himidity" to - humidity -; and
Col. 6, line 46, delete ",".

Signed and Sealed this

Twenty-seventh Day of October, 1987

*Attest:*

DONALD J. QUIGG

*Attesting Officer*  *Commissioner of Patents and Trademarks*